(12) United States Patent
Cheng et al.

(10) Patent No.: US 8,403,151 B2
(45) Date of Patent: Mar. 26, 2013

(54) NANOFIBER-CONTAINING MEMBRANE, A COMPOSITE MEMBRANE, A PROCESS FOR PRODUCING THEM AND THEIR USE

(75) Inventors: Tai-Hong Cheng, Sanchong (TW); Cheng-Chiang Huang, Luodong Township (TW)

(73) Assignee: Taiwan Textile Research Institute, Tucheng (TW)

( * ) Notice: Subject to any disclaimer, the term of this patent is extended or adjusted under 35 U.S.C. 154(b) by 458 days.

(21) Appl. No.: 12/751,644

(22) Filed: Mar. 31, 2010

(65) Prior Publication Data

US 2011/0163035 A1 Jul. 7, 2011

(30) Foreign Application Priority Data

Jan. 4, 2010 (TW) .............................. 99100004 A

(51) Int. Cl.
*B01D 39/00* (2006.01)
*B01D 39/14* (2006.01)
*B29C 47/00* (2006.01)

(52) U.S. Cl. .................... 210/500.43; 210/505; 264/465; 264/466; 442/327; 428/292.1

(58) Field of Classification Search ............. 210/500.43, 210/508, 505; 264/465, 466; 428/292.1, 428/414, 401; 442/327
See application file for complete search history.

(56) References Cited

U.S. PATENT DOCUMENTS

| | | | | |
|---|---|---|---|---|
| 4,041,331 A * | 8/1977 | Westerman et al. | ......... | 327/460 |
| 5,702,616 A * | 12/1997 | Degen et al. | ................. | 210/767 |
| 7,858,265 B2 * | 12/2010 | Kwak et al. | .................... | 429/529 |
| 7,988,860 B2 * | 8/2011 | Kalayci et al. | ................ | 210/679 |
| 8,231,013 B2 * | 7/2012 | Chu et al. | .................... | 210/500.1 |
| 2005/0026526 A1 * | 2/2005 | Verdegan et al. | ............ | 442/340 |
| 2005/0279696 A1 * | 12/2005 | Bahm et al. | .................... | 210/446 |
| 2009/0032475 A1 * | 2/2009 | Ferrer et al. | .................. | 210/799 |
| 2011/0020917 A1 * | 1/2011 | Wen et al. | .................. | 435/283.1 |
| 2011/0174720 A1 * | 7/2011 | Chen et al. | ................. | 210/323.1 |
| 2011/0198282 A1 * | 8/2011 | Chu et al. | ................. | 210/500.29 |
| 2012/0196078 A1 * | 8/2012 | Sotzing et al. | ............... | 428/114 |
| 2012/0215939 A1 * | 8/2012 | Lu | ................................. | 709/247 |

OTHER PUBLICATIONS

Chen et al., "Properties of Partially Hydrolyzed PAN Fiber," Transactions of Beijing Institute of Technology, vol. 28, No. 2, pp. 177-180 (2008) (English translation of abstract included).

Ma et al., "Application Research Evolution of Ultrasonic Technology in Fabrication of Polymers," Polymer Materials Science and Engineering, vol. 23, No. 5, pp. 15-18 (2007) (English translation of abstract included).

Yang et al., "Alkalized Pretreatment of Ethanolized Maize Stalk Accelerated by Ultrasonic Wave," Journal of Southwest University (Natural Science Edition), vol. 29, No. 7, pp. 149-152 (2007) (English translation of abstract included).

* cited by examiner

*Primary Examiner* — Ana Fortuna
(74) *Attorney, Agent, or Firm* — Hamre, Schumann, Mueller & Larson, P.C.

(57) ABSTRACT

A nanofiber-containing membrane has a specific surface area of 0.1 to 1000 m$^2$/g, porosity of 10 to 99.5% and a pore size of 0.01 to 10 μm. This provides a nanofiber-containing membrane having properties of high specific surface area, high porosity, nanoscale pore size, high pore uniformity and so on. A process for producing a nanofiber-containing membrane comprising producing a membrane from a polymer solution by electrospinning technology under optimal operation conditions.

25 Claims, 8 Drawing Sheets

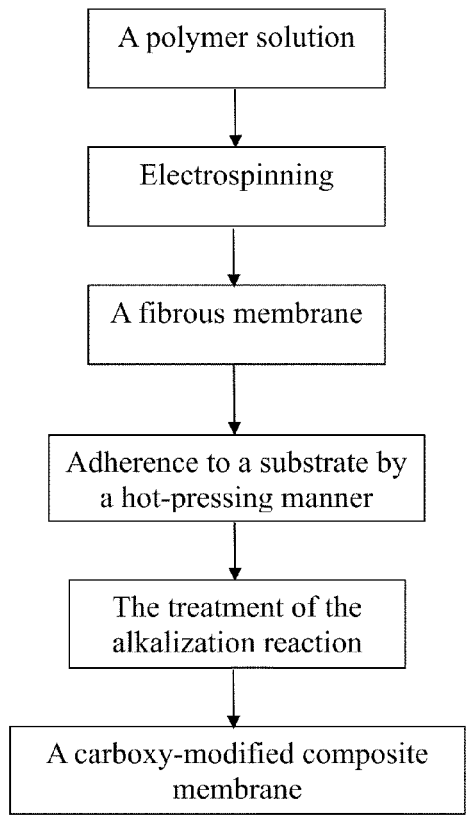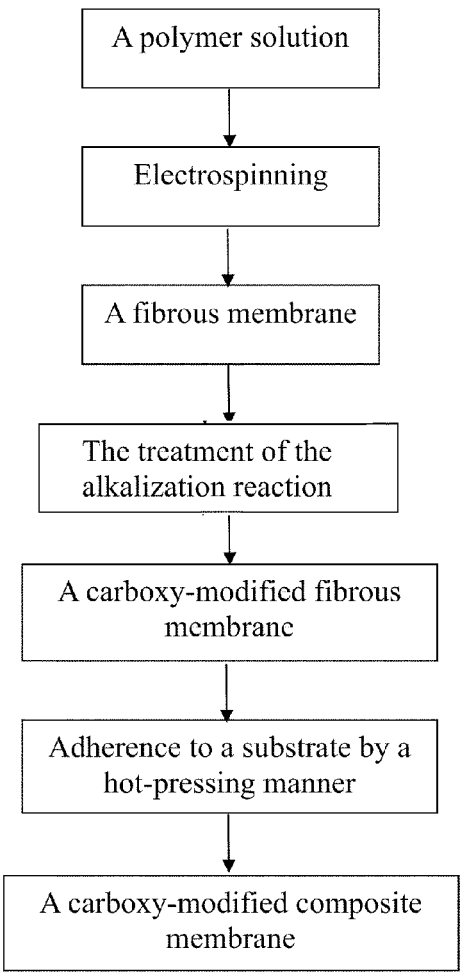
Figure 2A                    Figure 2B

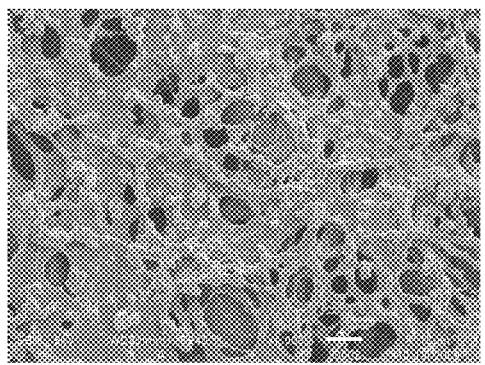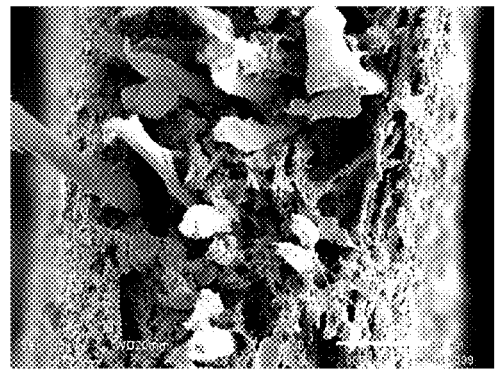
Figure 5A
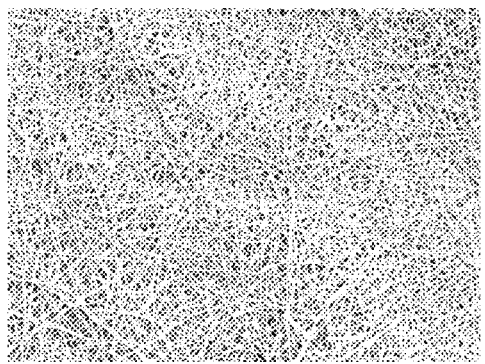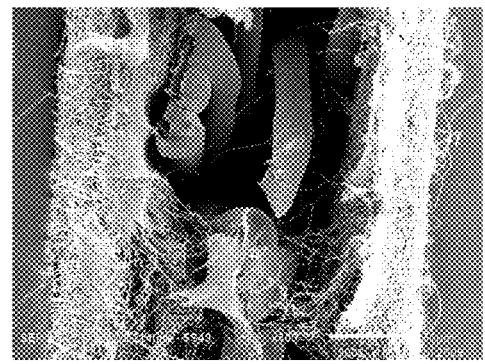
Figure 5B

NANOFIBER-CONTAINING MEMBRANE, A COMPOSITE MEMBRANE, A PROCESS FOR PRODUCING THEM AND THEIR USE

CROSS-REFERENCE TO RELATED APPLICATION

This application claims priority to the Taiwan patent application No. 99100004 filed on Jan. 4, 2010, the contents of which are incorporated herein by reference in its entirety.

FIELD OF THE INVENTION

The invention relates to a nanofiber-containing membrane, wherein the nanofiber consists of polyacrylonitrile or the copolymer thereof; to a composite membrane comprising the nanofiber-containing membrane; to processes for producing them; and to their use.

BACKGROUND OF THE INVENTION

Currently, separation technology is broadly used in various chemical processes for obtaining high purity chemical products, increasing the conversion of the desired compounds or products in the chemical processes, and decreasing the production cost, and has been improved continuously.

In general, the known separation processes include a colloidal filtration process, an ion exchange process and an affinity chromatographic process, wherein the separation is achieved by the colloidal filtration process based on the shapes or the sizes of the substances to be separated; by the ion exchange process based on the electric charge of the substances to be separated; and by the affinity chromatographic process based on the specific bonding of the substances to be separated.

For the ion exchange process, the types of the carriers used in the separation process mainly comprise particulate resins, laminated membranes and nanofibrous membranes. The various carriers have different separation properties and requirements. For example, for the particulate resins used in the common packed bed chromatography, the resins must have properties of uniform size, rigidity, high pressure resistance, etc. However, for the column packed with the resins, the possibility of generating a turbulent flow will be decreased if the particulate resins are closely packed, i.e. a space between the particles is reduced. Also, if the particle sizes are reduced, a space of turbulent flow will be reduced and the separation efficiency will be enhanced, even though it may decrease a flow rate of a fluid to be separated.

Further, for the application of the separation or the protein purification, the typical separation or purification process includes a gel chromatography, or membrane separations using an anion or cation-adsorbing membrane, or a nanofibrous membrane having high specificity, wherein the nanofibrous membrane is particularly suitable for the separation or purification process and is attracting a lot of attention due to the properties of high porosity, high specific surface area, low pressure drop, high throughput, etc.

U.S. Pat. No. 5,087,367 discloses a hydrolyzed membrane and a process for the preparation of the same, wherein the membrane is characterized in that the membrane consists essentially of a material which can generate a carboxy group by hydrolysis, such as polyacrylonitrile, and a part of the material is hydrolyzed to have carboxy groups and wherein the said hydrolysis is effected by the alkalization treatment of the membrane using an alkaline solution, such as sodium hydroxide.

U.S. Pat. No. 5,281,337 discloses a membrane system comprising a membrane support layer of a polyacrylonitrile having at least a portion of the surface —CN groups of the support layer hydrolyze to carboxylate salt groups and characterized by a high bonding ability to a membrane separating layer.

US 2004/0241436A1 discloses a nanofiber comprising a polymer and a protein, wherein the polymer and the protein are electrospun to form a protein membrane composition and the protein is covalently bound to the fiber.

Chen et al. disclose a process for the production of the ion-exchange fiber in "The production of ion-exchange fiber by partial hydrolization process of PAN fiber", *Transactions of Beijing Institute of Technology*, Vol. 28, No. 2, p. 117-180, 2008. Said process places the PAN fiber under an alkali condition, thereby converting the —CN groups of the microscale PAN fiber to amide groups (—$CONH_2$) and sodium carboxylate groups (—COONa) (i.e. the PAN-COONa type of ion-exchange fiber); followed by acidification in order to obtain the PAN-COOH type of fiber.

Besides, some literatures indicate that the application of ultrasonics in a chemical reaction would enhance the reaction, for example, the literatures published by Yang Yong et al. in "Alkaline Pretreatment of Ethanolized Maize Stalk Enhanced by Ultrasonic Wave", *Journal of Southwest University*, Vol. 29, No. 7, 2007 and by Ma et al. in "The research development of the application of the ultrasonic technique in a polymer synthesis", *Polymer materials science and engineering*, Vol. 23, No. 5, 2007.

However, there is still a need for separation membranes and separation processes better than the ones disclosed in the above-described patents and references in order to enhance the separation result and lower the production cost of a target product.

SUMMARY OF THE INVENTION

In order to meet the above need, the present inventors surprisingly found that a nanofiber-containing membrane having high pore uniformity can be obtained by electrospinning technology under the optimal operation conditions during spinning from a polymer solution. The isolated products having uniform particle sizes can be obtained from the said membrane.

Thus, one of the objects of the invention is to provide a nanofiber-containing membrane having properties of high specific surface area, high porosity, nanoscale pore size, high pore uniformity and so on.

The further object of the invention is to provide a process for producing a nanofiber-containing membrane described above, wherein the membrane is produced from a polymer solution by electrospinning technology under the optimal operation conditions.

Also, the present inventors also surprisingly found that a nanofiber-containing membrane is firstly produced from a polymer having cyano groups, preferably polyacrylonitrile or copolymers thereof by electrospinning technology under the optimal operation conditions, and then a membrane having carboxy groups on the nanofiber surface is obtained by the alkalization treatment. Due to the electronegativity carried by carboxy groups, the membrane is suitable for use in a separation process by interaction between positive and negative charges, such as separation of proteins or metal ions.

More particularly, the modification efficiency of functional groups may be raised if the ultrasonics is applied in the alkalization treatment, and this will lower the energy consumption and enhance the alkalization rate.

Thus, one further object of the invention is to provide a nanofiber-containing membrane wherein the cyano groups on the surface of the fiber are partially or fully modified to become carboxy groups; and a preparation process thereof.

Besides, one object of the invention is to provide a composite membrane comprising a substrate having the above-described membranes according to the invention on the one or two sides and to provide a process for producing the composite membrane.

The invention further provides uses of a carboxy group-modified or -unmodified nanofiber-containing membrane and of a composite membrane containing the same. These membranes are suitable for uses in the separation of the microsolids and the filtration of the bacteria by virtue of the physical properties of high specific surface area, high porosity, nanoscale pore size, high pore uniformity, high operation temperature and so on. The carboxy-modified membranes are suitable for uses in the treatment of waste waters and the purification of proteins, as well as the above-described uses. Also, the composite membrane is suitable for the above-described uses.

The membranes and the composite membranes of the invention have the following advantages: high adsorption/desorption capability (i.e. high adsorption/desorption rate and high adsorption/desorption amount), easy separation of heavy metals and organic substances having electropositive charges, operation capability under high temperature (particularly under a temperature of up to 300° C.), seldom obstruction during the separation process and reusable.

The characteristics of the invention can be clearly understood by referring to the figures and the detail description of the following preferable embodiments.

BRIEF DESCRIPTION OF DRAWINGS

FIG. 2A is a flowchart for the production of the composite membrane of the invention.

FIG. 2B is a flowchart for the production of the composite membrane of the invention.

FIG. 5A shows the appearance of the surface of the Sartorius membrane (×1000 times) on the left side and shows the cross-section appearance thereof (×500 times) on the right side.

FIG. 5B shows the appearance of the surface of the AEA-COOH membrane of the invention (×1000 times) on the left side and shows the cross-section appearance thereof (×500 times) on the right side.

DETAILED DESCRIPTION OF SPECIFIC EMBODIMENTS

As used herein, the terms "a", "an" and "the" are synonymous and used interchangeably with "one or more" and "at least one," unless the language and/or context clearly indicates otherwise. Accordingly, for example, reference to "a polymer having cyano groups" herein or in the appended claims can refer to a single polymer having cyano groups or more than one polymer having cyano groups. Additionally, all numerical values, unless otherwise specifically noted, are understood to be modified by the word "about."

In one embodiment, the nanofiber-containing membrane of the invention has the specific surface area of 0.1 to 1000 $m^2/g$, preferably 1 to 100 $m^2/g$, the porosity of 10 to 99.5%, preferably 80 to 99.5%, and the pore size of 0.01 to 10 μm, preferably 0.1 to 0.8 μm.

In one embodiment, in addition to the above-described characteristics, the nanofiber-containing membrane of the invention has carboxy functional group density of 0.1 to 30 meq/g on the surface thereof, particularly preferably 0.3 to 5 meq/g. This carboxy functional group density can be controlled by the treatment of a fiber-containing membrane under different alkalization conditions, wherein the fiber is produced from a polymer having cyano groups, preferably polyacrylonitrile or copolymers thereof.

The nanofiber-containing membrane of the invention refers to the membrane produced from the fibers as well as those containing other substances optionally added by a skilled person in the art to enhance the processibility and the mechanical properties of the membrane.

The nanofiber of the membrane or the composite membrane of the invention has a diameter between 10 and 500 nm, and the desired diameter can be achieved by changing the electrospinning distance, the voltage and the rotation speed of the collector in the electrospinning process.

The nanofiber used in the invention consists of a polymer having cyano groups (preferably polyacrylonitrile or copolymers thereof). The surface of the nanofiber is further partially or fully modified to have carboxy groups, and the inner of the fiber is still cyano groups. This makes the membrane or the composite membrane of the invention have better thermal stability.

Figure 1A:
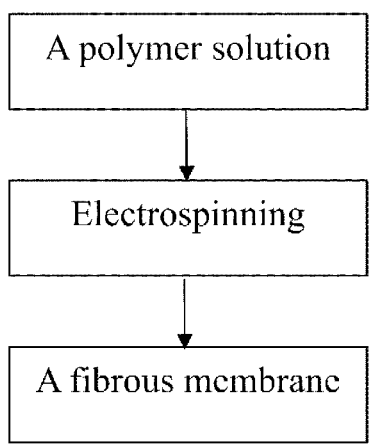
FIG. 1A is a flowchart for the production of the nanofiber-containing membrane.

In an embodiment of the invention, a process for producing the nanofiber-containing membrane comprises the steps (as shown in FIG. 1A) of:
1. Preparing a polymer solution of 5 to 30 (weight/volume) %, preferably 10 to 20 (weight/volume) %, based on the volume of the solution, wherein the types of solvent used in the solution includes dimethyl acetamide(DMAc), dimethylformamide(DMF), dimethyl sulfoxide(DMSO) and the like or the mixture thereof, preferably dimethyl acetamide (DMAc).
2. Treating the resulting polymer solution by electrospinning to obtain a nanofiber-containing membrane.

In order to make the membrane have high pore uniformity, the electrospinning treatment in the step 2 is particularly preferably carried out in the following manners: the collector is set at a rotation of 360 degrees; a two-component nozzle is used and the nozzle can be operated in a manner of the left-right movement. Further, in the steps of the electrospinning treatment, the voltage is set at 5 to 70 kV, preferably 20 to 30 kV; the rotation speed of the collector is 0 to 100 cm/sec; the electrospinning distance is 3 to 30 cm, preferably 10 to 20 cm; the feeding rate is 0.01 to 10 cc/hr, preferably 1 to 10 cc/hr; the width is 1 to 160 cm, preferably 10 to 20 cm; and the left-right movement is 0 to 12 times/min, preferably 5 to 12 times/min. Besides, the electrospinning treatment in the step 2 may also be operated in a manner of a rotating cylinder without a nozzle.

Figure 1B:
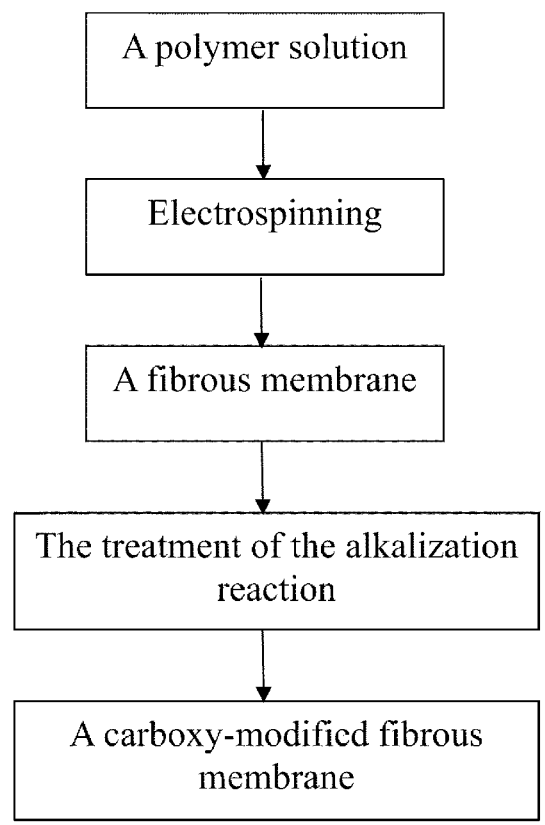
FIG. 1B is a flowchart for the production of the carboxy-modified nanofiber-containing membrane.

In another embodiment of the invention, a process for producing the nanofiber-containing membrane comprises the steps (as shown in FIG. 1B) of:
1. Obtaining a nanofiber-containing membrane by the above production process, wherein the polymer is a polymer having cyano groups, preferably polyacrylonitrile or copolymers thereof; and
2. Treating the membrane of step 1 by alkalization to modify the cyano groups on the surface of the fibers, wherein the membrane obtained from step 1 is placed in an alkaline solution of 0.1 N to 30 N, preferably 1 to 3N at a temperature of 4 to 150° C., preferably 25 to 85° C., particularly preferably 70 to 85, for 1 to 600 min and optionally the ultrasonics of 20 to 100 KHz, preferably 30 to 70 KHz, is applied.

The alkaline solution in the step 2 is known in the art, which may include KOH solution, NaOH solution, and so on. Preferably, the alkaline solution is NaOH solution.

In one embodiment of producing the composite membrane of the invention, (as shown in FIG. 2A), the alkalization treated or untreated membrane obtained by the previously process is adhered to one or two sides of a substrate by hot pressing at a temperature of 25 to 150 t, preferably 80 to 120° C. for 0 to 30 min, preferably 10 to 20 min, wherein the substrate comprises PMMA, PVC, PET, PS, PE, PP, a cellulose, a cellulose acetate and a carbon fiber.

In another embodiment of producing the composite membrane of the invention, the process comprises the steps (as shown in FIG. 2B) of:
1. Adhering the alkalization-treated or untreated membrane obtained by the previously process to one or two sides of a substrate by the hot pressing at a temperature of 25 to 150, preferably 80 to 120° C. for 0 to 30 min, preferably 10 to 20 min in order to obtain a composite membrane, wherein the substrate comprises PMMA, PVC, PET, PS, PE, PP, a cellulose, a cellulose acetate and a carbon fiber, and optionally
2. Treating the composite membrane by the alkalization to have carboxy groups on the surface of the fiber, wherein the alkalization treatment converts the cyano groups on the surface of the fiber into carboxy groups, wherein the treatment is carried out by placing the composite membrane obtained from step 1 in an alkaline solution of 0.1 N to 30 N, preferably 1 to 3 N, at a temperature of 4 to 150° C., preferably 25 to 85, for 1 to 600 min, preferably 1 to 60 min and optionally applying an ultrasonics of 20 to 100 KHz, preferably 30 to 70 KHz, The alkaline solution of step 2 is known in the art and may include NaOH solution or KOH solution. The NaOH solution is preferable.

EXAMPLES

Example 1

The Nanofiber-Containing Membrane

A polyacrylonitrile (PAN) (the acrylic fiber, commercially available from Fortune Industries Co., Ltd., U36) was dissolved in dimethyl acetamide (DMAc) (commercially available from 1 CHEMICAL CO., LTD.) to prepare a 15 (weight/volume) % of a polymer solution. Subsequently, the polymer solution was spun into a fiber by using an electrospinning machine (Taiwan Textile Research Institute, Taiwan). During spinning, a fibrous membrane having high porosity and high pore uniformity was obtained by setting the following operation conditions: the collector was set at a rotation of 360 degrees; a two-component nozzle was used and the nozzle was operated in the left-right movements. The parameters were further set as below: 20 cm of width, 26.5 kV of voltage, 10 cm/sec of rotation speed of the collector, 15.8 cm of electrospinning distance, 1 cc/hr of feeding rate and 12 times/min of left-right movements. The fibers were produced to form a fibrous membrane of the invention (abbreviated as PAN membrane) in the collector of the electrospinning machine.

Example 2

The Carboxy-Modified Nanofiber-Containing Membrane

The PAN membrane obtained from example 1 was placed in a 3N of NaOH solution (NaOH was commercially available from J.T. Baker) at a temperature of 85° C. for 35 min and on a shaker (Orbital shaker, Kansin Instruments, OS701) having a rotation speed of 150 rpm in order to obtain a carboxy-modified nanofiber-containing membrane (abbreviated as PAN-COOH membrane).

Example 3

The Carboxy-Modified Nanofiber-Containing Membrane

A carboxy-modified nanofiber-containing membrane (abbreviated as PAN-COOH membrane) was produced by a process analogous to example 2, except 42 kHz of ultrasonics was applied by an ultrasonic cleaner (Cole-Parmer, 8891) during the alkalization.

Example 4

The Carboxy-Modified Composite Membrane

Two membranes obtained from example 1 (i.e. alkalization-untreated membranes) were adhered to both sides of the substrate of PET membrane by hot pressing at 100° C. for 10 min in order to obtain a PAN-PET-PAN composite membrane (abbreviated as AEA membrane). The AEA membrane was placed in a 3N of NaOH solution (NaOH was commercially available from J.T. Baker) at a temperature of 85° C. for 35 min and on a shaker (Orbital shaker, Kansin Instruments, OS701) having a rotational speed of 150 rpm in order to obtain a carboxy-modified AEA membrane (abbreviated as AEA-COOH membrane).

Example 5

The Carboxy-Modified Composite Membrane

A carboxy-modified AEA membrane (abbreviated as AEA-COOH membrane) was produced by a process analogous to example 4, except 42 kHz of an ultrasonics was applied by an ultrasonic cleaner (Cole-Parmer, 8891) during the alkalization.

Example 6

The Carboxy-Modified Composite Membrane

Two membranes obtained from example 2 (i.e. untreated membranes) were adhered to both sides of the substrate of PET membrane by hot pressing at 100° C. for 10 min in order to obtain a carboxy-modified PAN-PET-PAN composite membrane (abbreviated as AEA-COOH membrane).

Example 7

(A) The Effects of Hydrolysis Temperatures and Alkalization Concentrations on Carboxy-Functional Group Densities Formed on the Surface of the Nanofiber AEA membranes of example 4 were separately placed in 1N, 2N and 3N of NaOH solutions at temperatures of 25° C., 40° C., 55° C., 70° C. and 85° C. for the alkaline hydrolysis 10 min in order to obtain AEA-COOH membranes having various COOH functional group densities. The carboxy-functional group density was determined for the AEA-COOH membrane based on the following steps (i.e. TBO test):

1. A 1 mM of aqueous TBO solution (pH=10) was prepared from Toluidine blue-O (abbreviated as TBO, commercially available from Sigma);
2. The membrane having the size of 1.5 cm×1.5 cm was placed in the aqueous TBO solution at room temperature and on a shaker (Orbital shaker, Kansin Instruments, OS701) having a rotational speed of 150 rpm for 6 hours;
3. Wash the membrane with 0.1 mM of NaOH after reaction;
4. TBO molecules were desorbed by using 50% (volume/volume) of glacial acetic acid solution at room temperature and on a shaker having a rotational speed of 150 rpm; and
5. The measurement was carried out by using UV/Visible spectrophotometer (Amersham Biosciences, Ultrospec 3100 pro) under a wave length of 633 nm (the blank was the glacial acetic acid solution).

It is found from the experimental results (as shown on table 1) that the increased reaction temperature and NaOH concentration can raise the carboxy-functional group density. Further, an AEA-COOH membrane having 87.6 µeq/g of carboxy-functional group density can be obtained after treatment for 10 min under an alkalization reaction condition of a temperature of 85° C. and a 3N of NaOH solution.

TABLE 1

| Temperature(° C.) | NaOH concentration | | |
|---|---|---|---|
| | 1N | 2N | 3N |
| 25 | 5.3 | 6.7 | 8.4 |
| 40 | 8.1 | 9.5 | 10.4 |
| 55 | 8.8 | 12.0 | 14.6 |
| 70 | 11.7 | 23.2 | 32.7 |
| 85 | 21.9 | 50.7 | 87.6 |

(B) The Effects of Alkaline Hydrolysis Durations and Alkalization Manners on the Carboxy-Functional Group Density Formed on the Surface (µeq/g)

During the alkalization, AEA-membranes obtained from example 3 were treated by applying 42 KHz of ultrasonics using an ultrasonic cleaner (Cole-Parmer, 8891) or by standing still for 10, 20 and 30 minutes to obtain AEA-COOH membranes having various carboxy-functional group density, wherein the 1N of NaOH solution and 55° C. of alkalization reaction temperature were used. The carboxy-functional group density of the surface was determined for the AEA-COOH membranes based on the above-described TBO measurement procedures.

It is found from the experimental results (as shown on table 2) that the increased reaction temperature and the NaOH concentration can raise the carboxy-functional group density on the surface of fibers, and the application of ultrasonics produces increased carboxy-functional group density as compared with standing still. This was proved by the result showing that the carboxy-functional group density produced by the alkaline hydrolysis for 30 minutes is equivalent to two times of those produced by the static alkaline hydrolysis for 30 minutes. Namely, the ultrasonics applied can make the alkaline solution easier to diffuse into the pores of the fibrous membrane and thus, increase the reaction area and decrease the alkalization time period.

TABLE 2

| The alkaline hydrolysis duration (min) | The manners of the alkaline treatment | |
|---|---|---|
| | Ultrasonic | Static |
| 10 | 14.2 | 9.6 |
| 20 | 38.9 | 21.6 |
| 30 | 72.6 | 32.8 |

Figure 3:
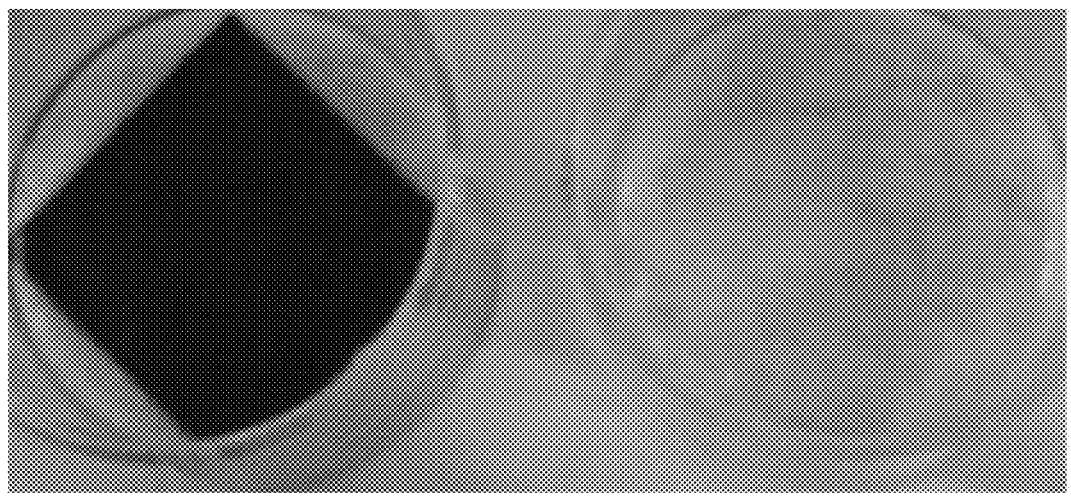
FIG. 3 shows the AEA-COOH membranes of the invention treated by alkalization in a long or short time, separately.

From the test (A) and (B), it can be seen that various carboxy-functional group densities can be obtained under various alkalization reaction conditions. However, it should be noted that the alkaline hydrolysis duration must be short because the PAN nanofibers dissolve if the treatment time is too long. This phenomenon can be clearly seen from FIG. 3. The sample of the left photo is a dark membrane whereas the right photo is a transparent membrane. The left sample is treated for the optimal hydrolysis time and thus the surface of the PAN fiber generates a large amount of carboxy groups; whereas the right sample is treated for a long alkalization time and thus, the PAN fibers are dissolved by an alkali and the PET substrate is merely remaining.

Besides, from the Tables 1 and 2, it is known that the resulting carboxy-functional group density produced by applying the ultrasonics during 30 minutes of the alkaline hydrolysis time (Table 2) is approximately equivalent to the resulting carboxy-functional group density produced by using 3N NaOH and a reaction temperature of 85□ (Table 1). This result proves that the application of ultrasonics can effectively enhance the efficiency of the alkalization. In other words, in the process of making the AEA membrane having the desired carboxy-functional group density, decrease in the treatment duration, the NaOH concentration or the operation temperature may be achieved by the application of ultrasonics.

Example 8

The Specific Surface Area and Porosity Test of the PAN-COOH Membrane (A) The Porosity Test of the PAN-COOH Membrane A sample of the PAN-COOH membrane of example 2 was placed in an oven (Drying oven, Resen Instruments, RHD-453W) for drying 24 hours, and then the sample was weighted about 0.5~1.5 g. Then, the porosity was determined by using a pycnometer (AccuPyc 1330 Pycnometer). The measured porosity was 86.8%. This value was higher than the value of a commonly used membrane. For example, the commercially available membrane produced by a phase conversion process (Sartorius Corporation, Model 94IEXC42-001) has the porosity of 73.4% measured by the same test.

(B) The Specific Surface Area Test of the PAN-COOH Membrane

According to ISO-9277, the specific surface area test was carried out for the PAN-COOH membrane obtained from example 2 by using a specific surface area analyzer (BET, Mucrometritics, ASPA 2000). The measured result was 11.5396 $m^2/g$. This value was higher than the value of a commonly used membrane (Sartorius Corporation, Model 94IEXC42-001) measured by the same test. The measured result was 0.8873 m²/g.

Example 9

Comparison Between the Performances of the Membrane or the Composite Membrane of the Invention and that of the Commercially Obtained Sartorius Membrane (A) The Pore Distribution Analysis of the Membrane The pore analyses were carried out for a SAR-COOH membrane (commercially available from Sartorius Corporation, Model 94IEXC42-001) as a comparative group and a PAN-PET-PAN membrane, a PAN2-PET-PAN2 membrane and a PAN3-PET-PAN3 membrane of the invention by using a pore analyzer (PMI, commercially available from Porous Material Inc.). The PAN-PET-PAN membrane was obtained by the production process according to example 3 (i.e. AEA-COOH membrane); the PAN2-PET-PAN2 membrane was obtained by a production process analogous to example 3 except both sides of the PET substrate were separately adhered by two-layer fibrous membranes; and the PAN3-PET-PAN3 membrane was obtained by a production process analogous to example 3 except both sides of the PET substrate were separately adhered by three-layer fibrous membranes. During the test, the test liquid used was galwick (commercially available from Porous Material Inc.); the air flow rate was 200 L/min; and the inner diameter of the used holder was 2.5 cm.

Figure 4A:
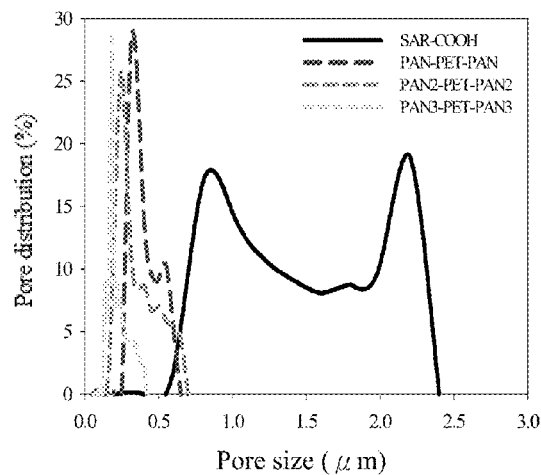
FIG. 4A is a plot of the pore distributions of the membranes of the invention and the commercially available SAR-COOH membrane.

The analysis results are shown in FIG. 4A. In comparison to the commercially available SAR-COOH membrane as the comparative group, all of the composite membranes of the invention have a narrow pore size range, no matter whether both sides of the substrate were adhered by one, two or three layers of the PAN-fiber membranes. Namely, the membranes of the invention have a pore size ranging from about 0.1 to 0.75 µm. Especially, the PAN3-PET-PAN3 membrane has a pore size in a range from 0.1 to 0.4 µm. These results can be proved by the membrane appearance obtained by a scanning electron microscope (SEM, JEOL, JSM 6510). FIG. 5A shows the appearances of a surface and cross-section of the Sartorius membrane produced by a phase conversion process (commercially available from Sartorius Corporation, Model 94IEXC42-001) wherein the membrane consists of one substrate layer and two porous membrane layers. FIG. 5B shows the appearances of a surface and cross-section of the AEA-COOH membrane of the invention. In comparison of the left photos in the FIGS. 5A and 5B, it may be clearly seen that the surface of the Sartorius membrane has different size pores whereas the surface of the AEA-membrane of the invention has more uniform pore size. The composite membrane of the invention particularly meets the need for separation of the substances having a specific size due to the narrow pore size range thereof.

(B) The Average Pore Size Analysis of the Membrane

Based on the above-described process, the pore analyses were carried out for a Sartorius membrane (commercially available from Sartorius Corporation, Model 94IEXC42-001) as a comparative group and laminates having different layers of the PAN-COOH membranes obtained from example 2 using a pore analyzer (PMI, commercially available from Porous Material Inc.), wherein the multiple-layer membranes were produced by hot pressing different layers of the PAN-COOH membranes of the invention for 10 minutes at a temperature of 100° C.

Figure 4B:
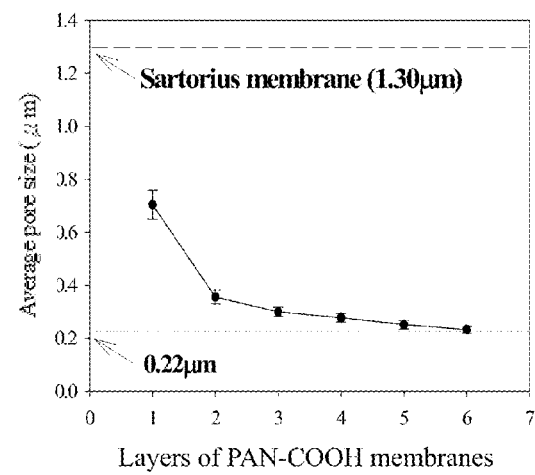
FIG. 4B is a plot of the average pore sizes of the membranes of the invention and the commercially available SAR-COOH membrane.

The analysis results are shown in FIG. 4B. In comparison to the Sartorius membrane as the comparative group, all of the laminates having different layers of the PAN-COOH membranes of the invention have a smaller average pore size. The laminates have pore sizes of below 0.4 µm when the layers are above 2 layers, and these pore sizes are advantageous for the separation of bacteria due to the lower pore sizes over the known membranes used for separating bacteria (i.e. below 0.45 µm).

(C) The Thermogravimetric Analysis of the Membrane

The thermal weight loss was measured for a PAN membrane obtained from example 1, a PAN-COOH membrane obtained from example 2 and a commercially available SAR-COOH membrane by using a thermal gravity analyzer (commercially available from TA Instruments, Model TGA Q50). The measurements are based on the following steps:

1. placing a sample to be tested of less than 10 g in the thermal gravity analyzer;
2. balancing for 10 minutes at 100° C. under the nitrogen atmosphere; and
3. raising the temperature to 600° C. in 20° C./min.

Figure 4C:
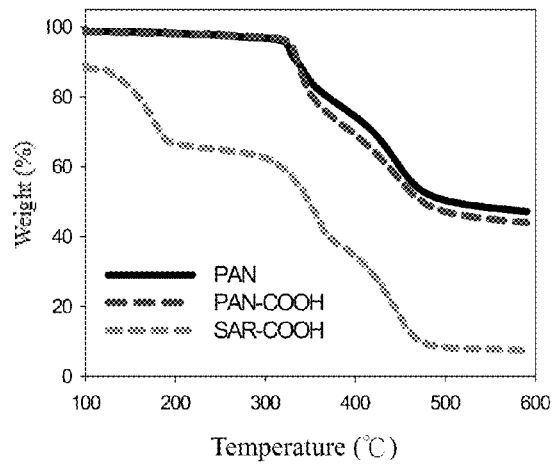
FIG. 4C is a plot of the thermogravimetric analysis for the membranes of the invention and the commercially available SAR-COOH membrane.

The analysis results are shown in FIG. 4C. In comparison to the SAR-COOH membrane as the comparative group, the PAN-COOH membrane and PAN membrane of the invention have excellent thermal stability. This proves that the fibers of the invention still can be operated under a temperature of up to 300° C. and also proves that the PAN membrane and the PAN-COOH membrane still have the original properties after a general operation of high pressure sterilization. Thus, they can be used for the sterile separation membrane needing a high temperature sterilization treatment, such as the filtration of bacteria. Further, from the results of FIG. 4C, it can be understood that the thermal degradation temperatures between the PAN-COOH membrane and the PAN membrane which are prepared in accordance with the invention are not different. This represents that the inner molecular structure of the fiber is not destroyed by the hydrolysis. Namely, the alkalization treatment only modifies the surface of the fiber from cyano groups to carboxy groups, and the cyano groups in the inner part of the fiber are not affected by the alkalization reaction.

(D) The Determination of the Ionic Group Density of the Membrane

The carboxy-functional group densities of the fiber surface of a PAN-COOH membrane, an AEA-COOH membrane and a SAR-COOH membrane as a comparative group were measured based on the TBO test in example 7, wherein the PAN-COOH membrane and the AEA-COOH membrane were separately produced by the processes analogous to examples 2 and 6 except alkaline hydrolysis lasts for 0 to 40 minutes.

Figure 4D:
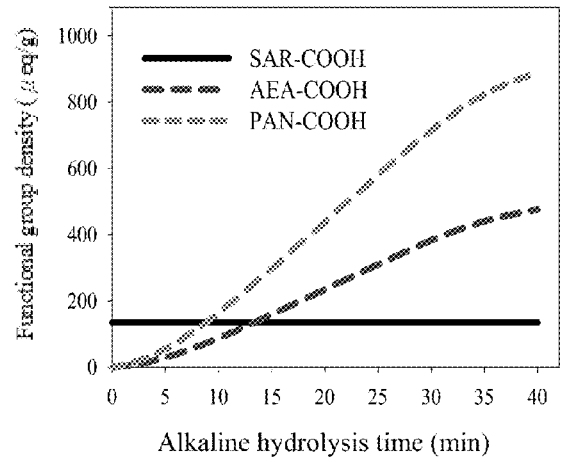
FIG. 4D is a plot of the ionic-group density of the membranes of the invention and the commercially available SAR-COOH membrane.
Figure 6:
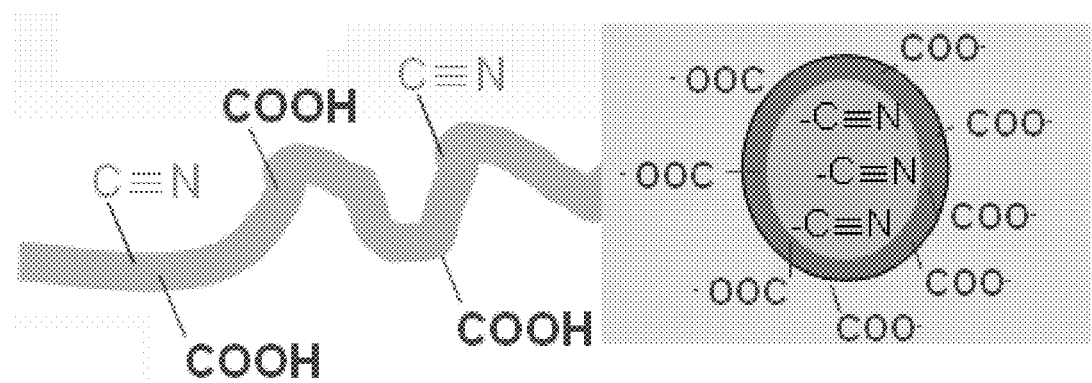
FIG. 6 is a schematic drawing of the surface and the cross section of the modified nanofiber of the invention.

The analysis results are shown in FIG. 4D. The membrane and the composite membrane of the invention have a carboxy-functional group density higher than the SAR-COOH membrane. Even when treated by alkalization for 40 minutes, the PAN-COOH membrane of the invention has a carboxy-functional group density higher than about 7.0 times of the comparative group and the AEA-COOH membrane of the invention has a carboxy-functional group density higher than about 3.2 times of the comparative group. Thus, the membranes and the composite membranes of the invention can adsorb more substances to be separated which carry the positive charges.

Example 10

Figure 7A:
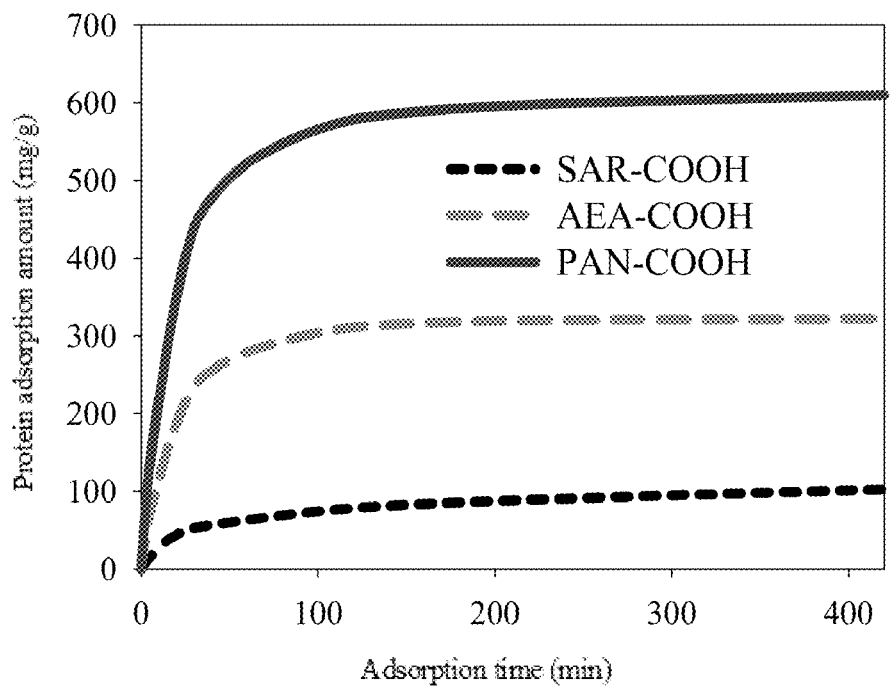
FIG. 7A is a plot of the protein adsorption amount of the PAN-COOH membrane, the AEA-COOH membrane and the SAR-COOH membrane.

The Protein Separation Test of the Inventive Fiber (A) The Analysis for the Protein Adsorption Amount of the Membrane The protein adsorption test was carried out for PAN-COOH membranes of example 2 and SAR-COOH membranes as comparative groups according to the following steps:

1. preparing a pH9 of buffer solution, wherein the buffer solution was a 20 mM of glycine solution prepared by dissolving glycine in a 0.1M of NaOH solution;
2. dissolving a lysozyme (commercially available from Sigma) in the pH9 of buffer solution to make the resulting lysozyme solution having 2 mg lysozyme/ml the solution;
3. obtaining samples of dimensions 1.5 cm×1.5 cm from the membrane to be tested;
4. placing the samples into the 2 ml of lysozyme solution at room temperature to adsorb the proteins for 0 to about 400 min, and setting the rotation speed of the shaker (Orbital shaker, Kansin Instruments, OS701) at 150 rpm;
5. removing the remaining liquid from the samples at various adsorption time points (i.e. without the tested membranes) in order to message the protein concentration, thereby obtaining the nonadsorbed protein amount;
6. calculating the protein adsorption amount of the membrane based on the equation of $$\text{Protein adsorption amount} = \frac{\text{Total protein weight-Nonadsorbed protein weight}}{\text{The weight of the membrane to be tested}};$$

and
7. plotting a figure of the adsorption amount versus various adsorption time points (as FIG. 7A).

The protein concentration was measured based on the following steps:
1. diluting the concentrated liquid of the Bio-Rad protein test reagent with deionized water for 5 times and then filtrating the dilute test reagent by suction filtration using Whatman#1 filter paper;
2. adding 100 μl of the protein solution to be tested into 5 ml of the test reagent, well mixing and then standing for 5 min; and
3. carrying out the measurement by using a spectrophotometer (UV/Visible spectrophotometer, Amersham Biosciences, Ultrospec 3100 pro) at a wavelength of 595 nm.

FIG. 7A shows that the protein adsorption amount of the PAN-COOH membrane of the invention is about 3.1 to 6.0 times of the commercially available SAR-COOH membrane. This proves that the high carboxy-functional group density of the PAN-COOH membrane of the invention can adsorb more proteins carrying positive charges and the cost of the protein separation process may thus be decreased.

(B) The Time Analysis for the Protein Adsorption of the Membrane

The above protein adsorption analyses were carried out for a PAN-COOH membrane of example 2, an AEA-membrane of example 6 and a SAR-COOH membrane as a comparative group. After the test, a figure of the adsorption amount versus the adsorption time of 0 to 5 min was plotted (as FIG. 7B).

Figure 7B:
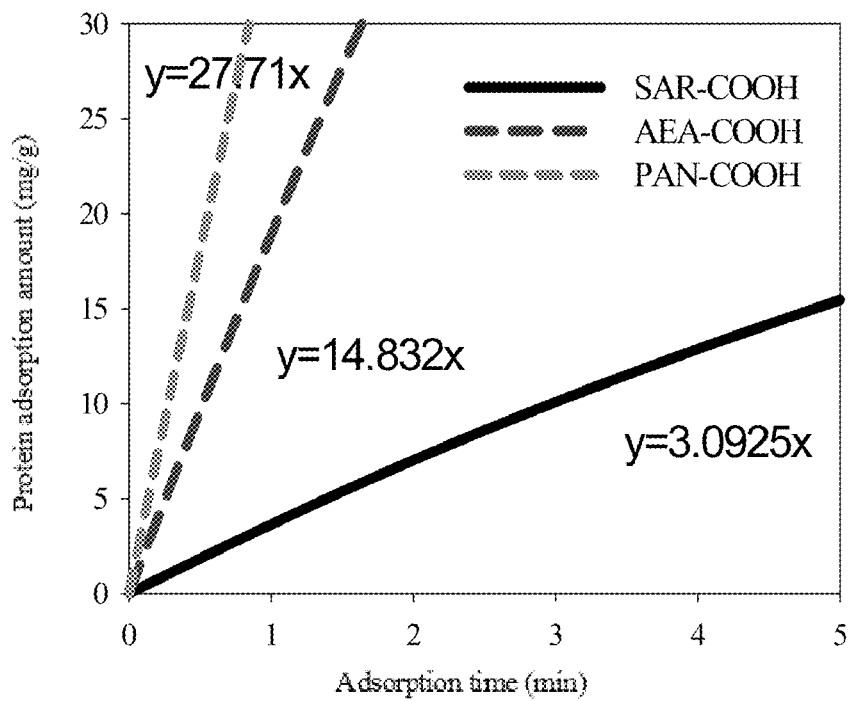
FIG. 7B is a plot of the protein adsorption time of the PAN-COOH membrane, the AEA-COOH membrane and the SAR-COOH membrane.

FIG. 7B shows that the protein adsorption rate of the PAN-COOH membrane of the invention is 27.71 mg/g·min; the AEA-COOH membrane is 14.832 mg/g·min; and the commercially available SAR-COOH membrane is 3.0925 mg/g·min. This represents that the protein adsorption rates of the PAN-COOH membrane and the AEA-COOH membrane of the invention are higher than the SAR-COOH membrane about 10 times and about 6 times, individually. This represents the membranes of the invention can achieve the desired adsorption amount in short time. Namely, the time required for the protein separation process may be decreased.

(C) The Reusability of the Membrane for the Protein Adsorption/Desorption

The protein adsorption analyses were carried out for an AEA-COON membrane of example 6 and the SAR-COOH membrane as a comparative group in accordance with the steps of example 10(A) except the lysozyme solution was 0.5 mg lysozyme/ml the solution and the following steps were further carried out after step 6:
1. preparing a pH12 of buffer solution, wherein the buffer solution was prepared by adding 0.5M of sodium chloride into the 20 mM of glycine solution;
2. adding the 2 ml of pH12 of buffer solution into the protein-adsorbed membrane at room temperature for 10 minutes and setting the rotation speed of the shaker (Orbital shaker, Kansin Instruments, OS701) at 150 rpm in order to perform the desorption treatment; and
3. determining the protein concentration of the remaining liquid obtained from the removal of the tested membrane again in order to obtain a protein desorption amount (mg/g).

The above steps were repeated 3 times to measure the protein adsorption amount, the protein desorption amount and the protein recovery of the membrane after each use, wherein the recovery was calculated based on the following equation:

$$\text{Protein recovery}(\%) = \frac{\text{Protein desorption amount}}{\text{Protein adsorption amount}} \times 100\%$$

The test results are shown on table 3. After repetition of the adsorption/desorption process 3 times, the AEA-COOH membrane of the invention has a higher protein recovery and also a higher protein adsorption and desorption amount than the SAR-COOH membrane. This proves that the AEA-membrane of the invention has excellent adsorption and desorption properties and can be reused.

TABLE 3

| Number of Reuse (cycles) | AEA-COOH | | | SAR-COOH | | |
|---|---|---|---|---|---|---|
| | Adsoption (mg/g) | Desorption (mg/g) | Recovery (%) | Adsoption (mg/g) | Desorption (mg/g) | Recovery (%) |
| 1 | 154.5 | 154.2 | 99.8 | 28.4 | 26.7 | 94.0 |
| 2 | 152.1 | 148.6 | 97.7 | 29.8 | 27.0 | 90.6 |
| 3 | 153.9 | 148.2 | 96.3 | 25.1 | 22.3 | 88.8 |

(D) In Comparison of the Protein Adsorption, Desorption and Recovery Under Various Protein Concentrations The test steps analogous to example 10(C) were carried out for an AEA-COOH membrane of example 6 and the SAR-COOH membrane as a comparative group carried out except the lysozyme solution has 0.5 mg of lysozyme and 2 mg of lysozyme per ml of the solution and the adsorption, respectively and desorption processes were only carried out one time.

The test results are shown on table 4. Although the higher concentration of lysozyme may make the adsorption amount of the membrane lower, the AEA-COOH membrane of the invention still have a higher protein recovery and also higher protein adsorption and desorption amounts than the SAR-COOH membrane. This also proves that the high concentration of the protein solution has less influence on the adsorption/desorption properties of the AEA-COOH membrane of the invention.

TABLE 4

| Total protein concentration (mg) | AEA-COOH | | | SAR-COOH | | |
| --- | --- | --- | --- | --- | --- | --- |
|  | Adsorption (mg/g) | Desorption (mg/g) | Recovery (%) | Adsorption (mg/g) | Desorption (mg/g) | Recovery (%) |
| 4 | 596.5 | 531.1 | 89.0 | 102.4 | 80.1 | 78.2 |
| 1 | 154.5 | 154.2 | 99.8 | 28.4 | 26.7 | 94 |

Example 11

The Comparison of the Adsorption Property for the Heavy Metal Ions (A) The Analysis for the Heavy Metal Adsorption Amount of the Membrane The heavy metal adsorption test was carried out for a PAN-COOH membrane of example 2, an AEA-COOH membrane of example 6 and a SAR-COOH membrane as a comparative group as below:
1. 0.01M of aqueous copper sulfate solution, 0.01M of aqueous nickel sulfate solution and 0.01M of aqueous cobalt sulfate solution were prepared, wherein the copper sulfate and the nickel sulfate were commercially available from Merck and the cobalt sulfate was commercially available from J.T. Baker;
2. 1 ml of the above solution was added into a sample of the membrane having the dimensions 1.5 cm×1.5 cm for 4 hr in order to perform a adsorption process; and
3. The metal ionic concentration was determined for the remaining liquid removed from the sample by using an elemental analyzer (Varian, SpectrAA 55).

The test results are shown on table 5. It can be clearly understood that the amounts of positively charged metal ions adsorbed by the PAN-COOH membrane and the AEA-membrane of the invention are about 5 times and about 3 times of the adsorption amount of the SAR-COOH membrane, individually. This can prove that the PAN-COOH membrane and the AEA-membrane of the invention have higher performance for adsorbing the positively charged metal ions than the known and commonly used SAR-COOH membrane. This performance is particularly suitable for use in the treatment of the heavy metal-polluted waste water.

TABLE 5

| Heavy metal ion | The adsorption amounts for the heavy metals (mg metal ion/g membrane) | | |
| --- | --- | --- | --- |
|  | PAN-COOH | AEA-COOH | SAR-COOH |
| $Cu^{2+}$ | 1173.39 | 774.19 | 272.18 |
| $Ni^{2+}$ | 1200.94 | 792.37 | 250.88 |
| $Co^{2+}$ | 1036.70 | 684.00 | 233.52 |

(B) The Analysis for the Adsorption Time of the Heavy Metal Ions of the Membrane The heavy metal adsorption test was performed for a PAN-COOH membrane of example 2, an AEA-COOH membrane of example 6 and the comparative group of a SAR-COOH membrane following the procedures in example 11(A). Subsequently, a figure of the adsorption amounts of the heavy metals versus the adsorption time of 0 to 5 minutes was plotted (as FIG. 8).

Figure 8:
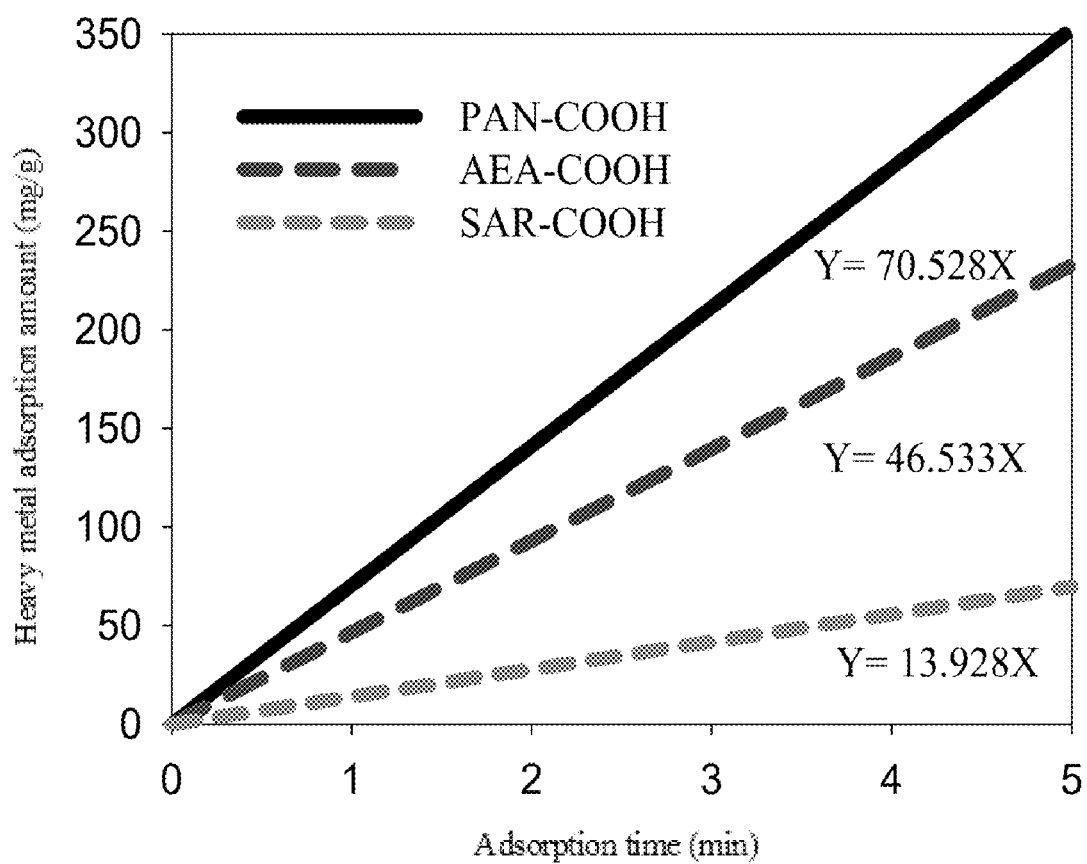
FIG. 8 is a plot of the adsorption time of the heavy metal ions of the PAN-COOH membrane, the AEA-COOH membrane and the SAR-COOH membrane.

FIG. 8 shows that the adsorption rate of the heavy metal ions for the PAN-COOH membrane of the invention is 70.528 mg/g·min; for the AEA-COOH membrane of the invention, the adsorption rate is 46.533 mg/g·min; and for the commercially available SAR-COOH membrane, the adsorption rate is 13.928 mg/g·min. This proves that the membranes of the invention can achieve the desired adsorption amounts in short time, i.e. decrease the time required for the separation of the heavy metal ions.

Therefore, in view of the above examples, it can be proven that the inventive membranes produced by the electrospinning technology under the optimal operation conditions have the properties of high specific surface area, high porosity, nanoscale pore sizes, high pore uniformity and so on. These membranes have high separation efficiency in the separation process and reduce the separation cost. Also, they particularly meet the need of separating the particles having narrow particle sizes.

Further, a nanofiber-containing membrane is produced from the polymers having cyano groups, such as polyacrylonitrile by the electrospinning technology under the optimal operation conditions. After the alkalization treatment, the membrane having carboxy groups on the surface of nanofibers can be obtained. Also, the membranes of the invention are particularly suitable for the separation process having positive-negative charge interactions (e.g. the separation of proteins or metal ions) by virtue of the electronegative property of the carboxy groups.

Furthermore, the above examples also prove that the application of the ultrasonics in the alkalization reaction can raise the modification efficiency of the functional groups in order to lower the energy consumption and increase the reaction rate of the alkalization.

The above examples also demonstrate that the nanofiber-containing membranes unmodified or modified by carboxy groups are suitable for uses in the separation of the microsolids and the filtration of the bacteria, etc, since they have the physical properties of high specific surface area, high porosity, nanoscale pore sizes, high pore uniformity and high operation temperature and so on. In addition to the above-described uses, the carboxy-modified membrane is also suitable for uses in the treatment of waste waters, the purification of proteins and so on. Also, the composite membrane is also suitable for the above-described uses.

Further, the above-described examples demonstrate that the membranes and the composite membranes of the invention have the following advantages: high adsorption/desorption capability (i.e. high adsorption/desorption rate and high adsorption/desorption amount), easy separation of the heavy metals and the organic substances having electropositive charges, usability under a high temperature (particularly under a temperature of up to 300° C.), seldom obstruction during the separation process and reusability and so on.

It will be appreciated by those skilled in the art that modifications could be made to the embodiments described above without departing from the inventive spirit thereof. It is understood, therefore, that this invention is not limited to the particular embodiments disclosed, but it is intended to cover modifications within the spirit and scope of the present invention as defined by the appended claims.

What is claimed is:

1. A nanofiber-containing membrane, wherein the membrane has a specific surface area of 0.1 to 1000 m$^2$/g, porosity of 10 to 99.5% and a pore size of 0.01 to 10 μm, wherein the surface of the membrane has a carboxy-functional group density of 0.1 to 30 meq/g.

2. The membrane of claim 1, which can be operated at a temperature of up to 300° C.

3. The membrane of claim 1, wherein the diameter of the nanofiber is between 10 to 500 nm.

4. The membrane of claim 1, wherein the nanofiber consists of a polymer having cyano groups and the cyano groups of the polymer are partially or fully modified to carboxy groups.

5. The membrane of claim 4, wherein the polymer having the cyano groups is polyacrylonitrile or copolymers thereof.

6. The membrane of claim 4, wherein an inner side of the fiber contains cyano groups.

7. A process for producing a nanofiber containing membrane of claim 1, wherein the membrane is produced by an electrospinning process from a polymer solution, wherein the electrospinning process is operated by setting a collector to have a rotation of 360 degrees, using a two-component nozzle and operating the nozzle in left-right movement, or the electrospinning process is operated by a rotating cylinder without a nozzle.

8. The process of claim 7, wherein the membrane produced by a process according to claim 7 is subjected to alkalization hydrolysis treatment.

9. The process of claim 8, wherein the polymer solution is a solution of 5 to 30 (weight/volume) % of a polymer having cyano groups in a solvent.

10. The process of claim 9, wherein the polymer is polyacrylonitrile or copolymers thereof.

11. The process of claim 8, wherein during the electrospinning process, the voltage is 5 to 70 kV, the rotation speed of the collector is 0 to 100 cm/sec, the electrospinning distance is 3 to 30 cm, the feeding rate is 0.01 to 10 cc/hr and the left-right movement is 0 to 12 times/min.

12. The process of claim 8, wherein the alkalization hydrolysis treatment is performed by placing the membrane in an alkaline solution, and optionally applying ultrasonics during the alkalization hydrolysis treatment.

13. The process of claim 12, wherein the concentration of the alkaline solution is 0.1 to 30N; the temperature is 4 to 150 ▢; and the alkaline hydrolysis treatment time lasts for 1 to 600 min.

14. The process of claim 12, wherein the alkaline solution comprises a NaOH solution or a KOH solution.

15. The process of claim 12, wherein the strength of the ultrasonics applied is 10 to 100 KHz.

16. A composite membrane comprising a substrate, which is characterized in that one or two sides of the substrate have a membrane according to claim 1.

17. Use of a membrane according to claim 1 for the treatment of a heavy metal and an organic substance in a waste water, the filtration of the bacterial, the purification of protein and the separation of the micro-solid, comprising:
    contacting the membrane with wastewater or a solution to be treated.

18. Use of a composite membrane according to claim 16 for the treatment of a heavy metal and an organic substance in a waste water, the filtration of the bacterial, the purification of protein and the separation of the micro-solid, comprising: contacting the membrane with wastewater or a solution to be treated.

19. A process for producing a composite membrane, which comprises the following steps of:
    (1) adhering one or two membranes according to claim 1 to one or two sides of
        (1) a substrate, and
        (2) treating the composite membrane by an alkalization hydrolysis treatment, treatment.

20. The process of claim 19, the nanofiber of the membrane according to claim 1 consists of polyacrylonitrile or copolymers thereof.

21. The process of claim 19, wherein in step (1), the membrane is adhered to the substrate by hot-pressing at 25 to 150 ▢ for 0 to 30 min.

22. The process of claim 19, wherein the alkalization hydrolysis treatment in step (2) is performed by placing the membrane in an alkaline solution, and optionally applying ultrasonics during the alkalization hydrolysis treatment.

23. The process of claim 22, wherein the concentration of the alkaline solution is 0.1 to 30 N; the temperature is 4 to 150 ▢; and the alkaline hydrolysis treatment time lasts for 1 to 600 min.

24. The process of claim 22, wherein the alkaline solution comprises a NaOH solution or a KOH solution.

25. The process of claim 22, wherein the ultrasonics is applied at strength of 10 to 100 KHz.

* * * * *